(12) United States Patent
Zhan et al.

(10) Patent No.: US 8,773,491 B2
(45) Date of Patent: Jul. 8, 2014

(54) METHOD, APPARATUS, AND SYSTEM FOR IMPLEMENTING AUDIO MIXING

(75) Inventors: Wuzhou Zhan, Shenzhen (CN); Dongqi Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 45 days.

(21) Appl. No.: 13/469,782

(22) Filed: May 11, 2012

(65) Prior Publication Data

US 2012/0224023 A1     Sep. 6, 2012

Related U.S. Application Data

(63) Continuation of application No. PCT/CN2010/075891, filed on Aug. 11, 2010.

(30) Foreign Application Priority Data

Nov. 13, 2009    (CN) .......................... 2009 1 0207184

(51) Int. Cl.
*H04N 7/14* (2006.01)

(52) U.S. Cl.
USPC ....................................... 348/14.01

(58) Field of Classification Search
USPC .......................................... 370/267
See application file for complete search history.

(56) References Cited

U.S. PATENT DOCUMENTS

| | | | |
|---|---|---|---|
| 8,358,600 B2 * | 1/2013 | Bevin et al. ................... | 370/267 |
| 8,391,513 B2 * | 3/2013 | Ishikawa et al. .............. | 381/110 |
| 8,482,614 B2 * | 7/2013 | Dean ............................. | 348/177 |
| 2007/0022464 A1 * | 1/2007 | Dean ............................. | 725/136 |
| 2008/0005246 A1 | 1/2008 | Vanbuskirk et al. | |
| 2008/0159507 A1 | 7/2008 | Virolainen et al. | |
| 2011/0261943 A1 | 10/2011 | Yue | |

FOREIGN PATENT DOCUMENTS

| | | |
|---|---|---|
| CN | 1953537 A | 4/2007 |
| CN | 101179693 A | 5/2008 |
| CN | 101466043 A | 6/2009 |
| EP | 1855455 A1 | 11/2007 |
| WO | WO 2006/103584 A1 | 10/2006 |
| WO | WO 2008046967 A1 | 4/2008 |

(Continued)

OTHER PUBLICATIONS

Extended European Search Report issued in corresponding European Patent Application No. 10829475.2, mailed Feb. 27, 2013.

(Continued)

*Primary Examiner* — Maria El-Zoobi
(74) *Attorney, Agent, or Firm* — Brinks Gilson & Lione

(57) ABSTRACT

A method, an apparatus, and a system for implementing audio mixing are provided. The method for implementing audio mixing includes: receiving an audio signal sent by each sending conference site, where the audio signals include an audio channel-based audio signal and an audio object-based audio signal; selecting an audio signal for each receiving conference site from the received audio signals; processing the selected audio signals according to types of receiving conference sites, where the receiving conference sites include an audio channel-based receiving conference site and an audio object-based receiving conference site; and sending the processed audio signal to each receiving conference site respectively according to the type of the receiving conference site. The present invention is applicable to a multipoint conference where audio mixing is performed on an audio channel-based audio signal and an audio object-based audio signal.

14 Claims, 7 Drawing Sheets

(56) References Cited

FOREIGN PATENT DOCUMENTS

| WO | WO 2008/120933 A1 | 10/2008 |
| WO | WO 2008148591 A1 | 12/2008 |
| WO | WO 2009050896 A1 | 4/2009 |

OTHER PUBLICATIONS

International Search Report and Written Opinion of the International Searching Authority issued in corresponding PCT Patent Application No. PCT/CN2010/075891, mailed Nov. 18, 2010.

* cited by examiner

METHOD, APPARATUS, AND SYSTEM FOR IMPLEMENTING AUDIO MIXING

CROSS-REFERENCE TO RELATED APPLICATIONS

This application is a continuation of International Application No. PCT/CN2010/075891, filed on Aug. 11, 2010, which claims priority to Chinese Patent Application No. 200910207184.8, filed on Nov. 13, 2009, both of which are hereby incorporated by reference in their entireties.

FIELD OF THE INVENTION

The present invention relates to the field of communications technologies, and in particular, to a method, an apparatus, and a system for implementing audio mixing.

BACKGROUND OF THE INVENTION

At present, with development of communications technologies, a video conference has been widely developed and applied. The video conference may be understood as a television conference service in a general sense. By means of multimedia communication, a conference is held by using a television device and a communication network, so that a function of exchanging images, voice, and data between two sites or among multiple sites at the same time may be implemented. A video conference system generally includes a video terminal device, a communication network, and a multipoint control unit (Multipoint Control Unit, MCU).

Generally, a conventional conference terminal has merely a mono channel or a dual channel, so that a sense of space and direction is generally absent or only a left/right direction can be distinguished. A next generation conference terminal generally adopts a multi-screen solution, in which an image is as large as a real person. In order to experience a strong sense of presence and immersion, a strong sense of direction and space of a sound is generally required. However, a conventional dual channel can no longer satisfy the requirement. In order to reflect a strong sense of direction and space, two solutions are adopted in the prior art. One is to perform encoding and transmission based on a multi channel method. The other is to perform encoding and transmission based on an audio protocol of an audio object. In this way, a sense of direction and space of a sound can be carried in the case that a bit rate is increased slightly. An MCU audio mixing method in the prior art is usually an audio channel-based audio mixing solution.

During the implementation of the present invention, the inventor finds that the prior art has at least the following problems.

With an existing audio channel-based audio mixing method, in the same conference, only a conventional conference terminal is compatible, but a next generation multi channel-based terminal and a next generation audio object-based terminal are not compatible.

SUMMARY OF THE INVENTION

Embodiments of the present invention provide a method, an apparatus, and a system for implementing audio mixing, so that compatibility with different conference terminals is improved.

Technical solutions adopted in the embodiments of the present invention are:

A method for implementing audio mixing includes:

receiving an audio signal sent by each sending conference site, where the received audio signals include an audio channel-based audio signal and an audio object-based audio signal;

selecting an audio signal for each receiving conference site from the received audio signals;

processing the selected audio signals according to types of receiving conference sites, where the receiving conference sites include an audio channel-based receiving conference site and an audio object-based receiving conference site; and sending the processed audio signal to each receiving conference site respectively according to the type of the receiving conference site.

An apparatus for implementing audio mixing is specifically a multipoint control unit, and includes:

a receiving module, configured to receive an audio signal sent by each sending conference site, where the received audio signals include an audio channel-based audio signal and an audio object-based audio signal;

a selecting module, configured to select an audio signal for each receiving conference site from the received audio signals;

a processing module, configured to process the selected audio signals according to types of receiving conference sites, where the receiving conference sites include an audio channel-based receiving conference site and an audio object-based receiving conference site; and a sending module, configured to send the processed audio signal to each receiving conference site respectively according to the type of the receiving conference site.

A system for implementing audio mixing includes multiple sending conference sites, multiple receiving conference sites, and a multipoint control unit, where the sending conference sites are configured to send audio signals to the multipoint control unit, where the audio signals include an audio channel-based audio signal and an audio object-based audio signal;

the multipoint control unit is configured to receive the audio signals sent by the sending conference sites, select an audio signal for each receiving conference site from the received audio signals, process the selected audio signals according to types of receiving conference sites, and send the processed audio signal to each receiving conference site respectively according to the type of the receiving conference site, where the receiving conference sites include an audio channel-based receiving conference site and an audio object-based receiving conference site; and the receiving conference sites are configured to receive the processed audio signals from the multipoint control unit.

With the method, the apparatus, and the system for implementing audio mixing that are provided in the embodiments of the present invention, after receiving an audio channel-based audio signal and an audio object-based audio signal, where the audio channel-based audio signal and the audio object-based audio signal are sent by each sending conference site, a multipoint control unit selects an audio signal for each receiving conference site, processes the selected audio signals according to types of receiving conference sites, and sends the processed audio signal to each receiving conference site respectively. Compared with the prior art, the multipoint control unit can perform audio mixing on the audio channel-based audio signal and the audio object-based audio signal, so as to be compatible with a conventional conference terminal, a next generation multi channel-based terminal, and a next generation audio object-based terminal in the same multipoint conference, thus improving quality of user experience.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

The technical solutions in the embodiments of the present invention are clearly and fully described in the following with reference to the accompanying drawings in the embodiments of the present invention. Apparently, the embodiments to be described are only a part rather than all of the embodiments of the present invention. Based on the embodiments of the present invention, all other embodiments obtained by persons of ordinary skill in the art without creative efforts shall fall within the protection scope of the present invention.

In order to make the advantages of the technical solutions of the present invention clearer, the present invention is described in detail in the following with reference to the accompanying drawings and embodiments.

Embodiment 1

Figure 1:
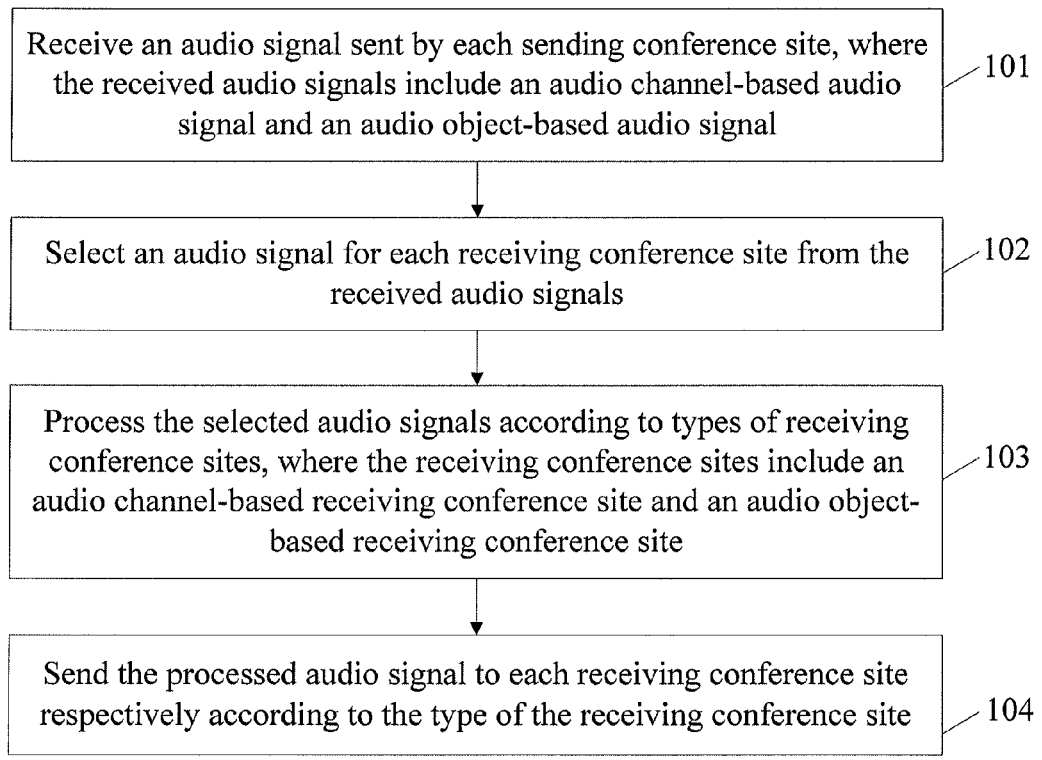
FIG. 1 is a flowchart of a method for implementing audio mixing according to a first embodiment of the present invention.

This embodiment provides a method for implementing audio mixing. As shown in FIG. 1, the method for implementing audio mixing includes:

101: Receive an audio signal sent by each sending conference site, where the received audio signals include an audio channel-based audio signal and an audio object-based audio signal.

102: Select an audio signal for each receiving conference site from the received audio signals.

103: Process the selected audio signals according to types of receiving conference sites, where the receiving conference sites include an audio channel-based receiving conference site and an audio object-based receiving conference site.

104: Send the processed audio signal to each receiving conference site respectively according to the type of the receiving conference site.

The same conference site may send an audio signal, and may also receive an audio signal. That is to say, a sending conference site and a receiving conference site may be the same conference site.

With the method for implementing audio mixing in this embodiment of the present invention, after receiving an audio channel-based audio signal and an audio object-based audio signal, where the audio channel-based audio signal and the audio object-based audio signal are sent by each sending conference site, a multipoint control unit selects an audio signal for each receiving conference site, processes the selected audio signals according to types of receiving conference sites, and sends the processed audio signal to each receiving conference site respectively. Compared with the prior art, the multipoint control unit can perform audio mixing on the audio channel-based audio signal and the audio object-based audio signal, so as to be compatible with a conventional conference terminal, a next generation multi channel-based terminal, and a next generation audio object-based terminal in the same multipoint conference, thus improving quality of user experience.

Embodiment 2

In this embodiment, a multipoint conference system has multiple sending conference sites and multiple receiving conference sites. The sending conference sites include an audio channel-based sending conference site and an audio object-based sending conference site. An MCU performs audio mixing on an audio signal sent by a sending conference site. The same conference site may send an audio signal, and may also receive an audio signal. That is to say, a sending conference site and a receiving conference site may be the same conference site.

Figure 2:
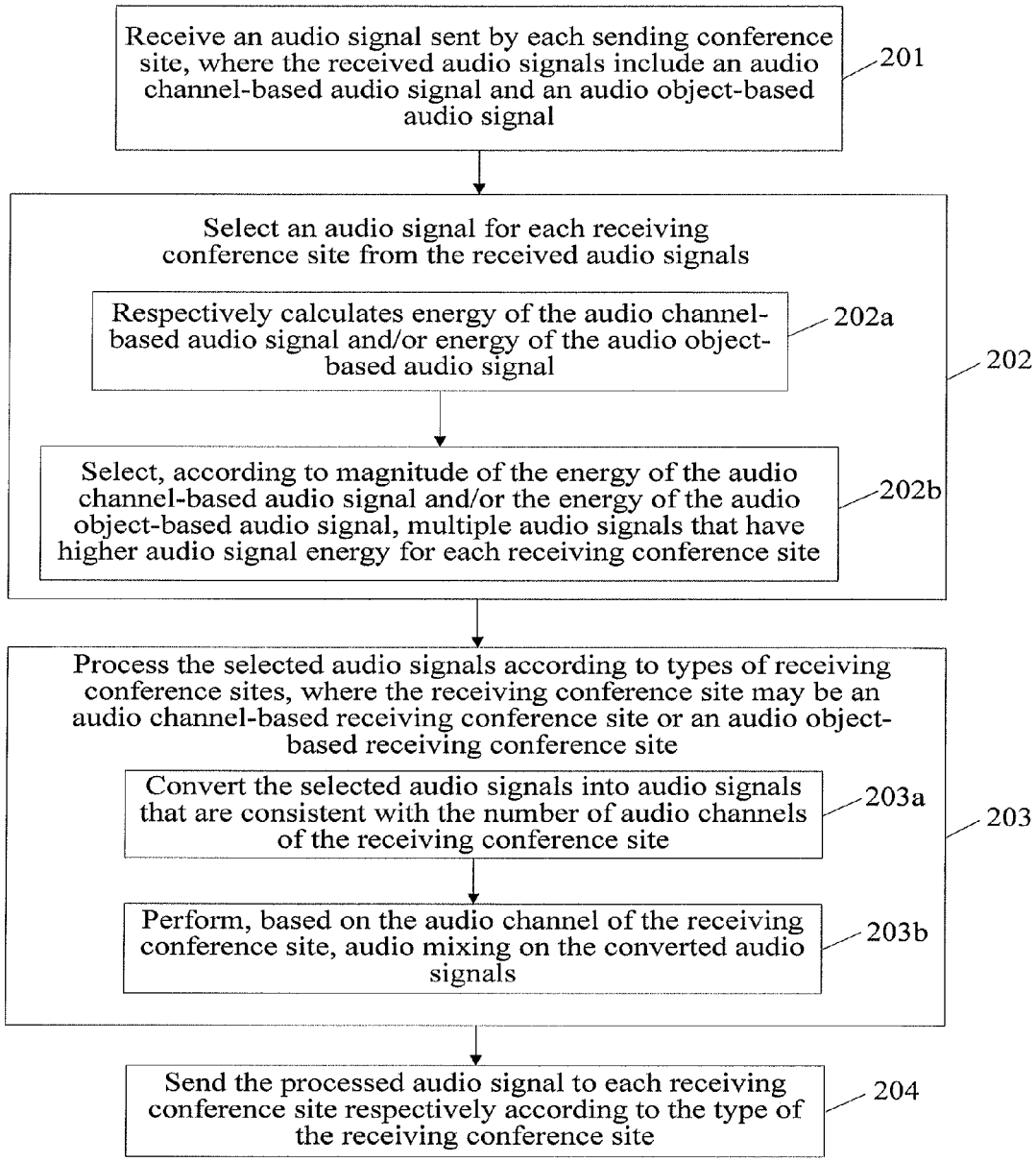
FIG. 2 and FIG. 3 are flowcharts of a method for implementing audio mixing according to a second embodiment of the present invention.
Figure 3:
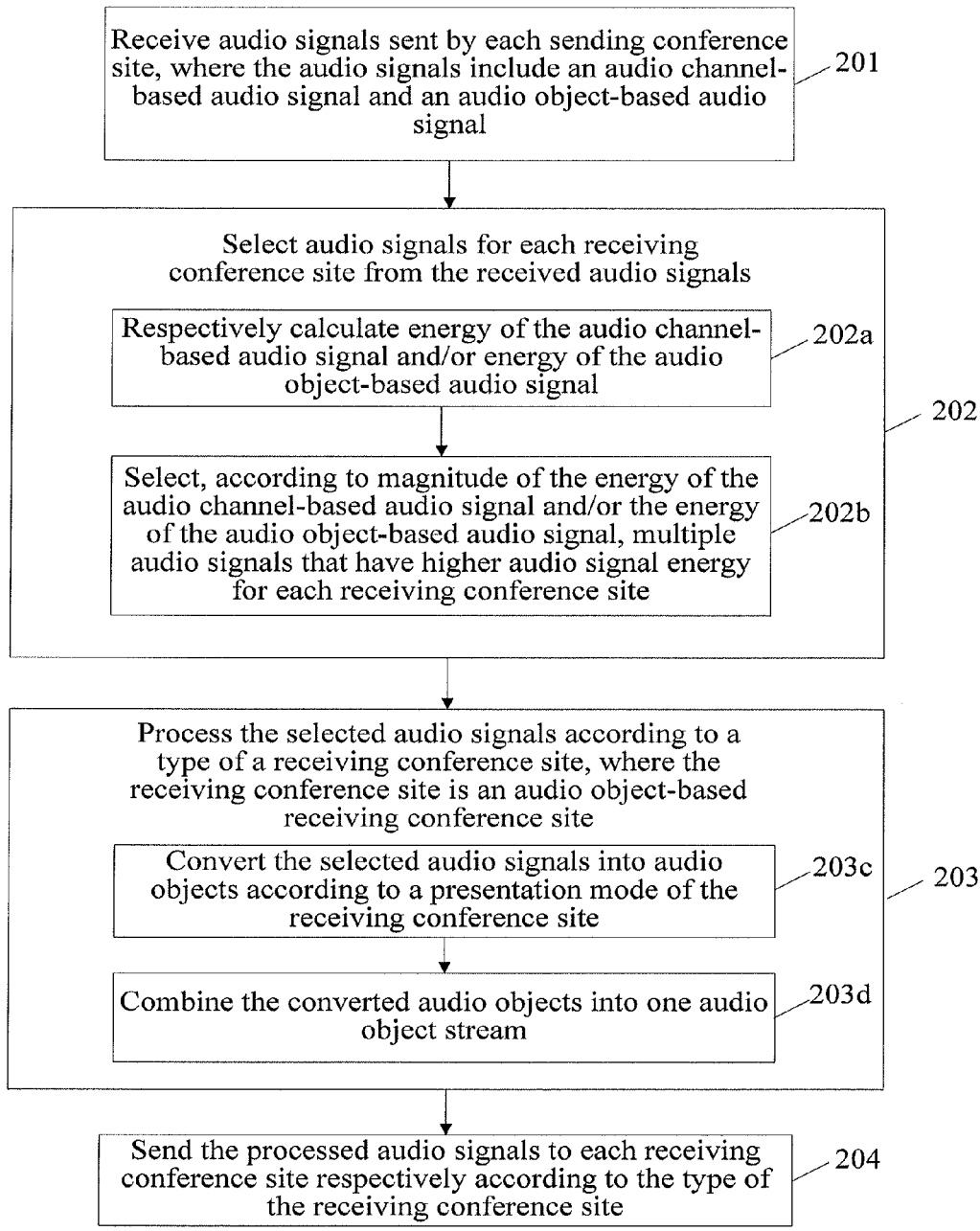

As shown in FIG. 2 and FIG. 3, the method for implementing audio mixing includes:

201: An MCU receives an audio signal sent by each sending conference site, where the received audio signals include an audio channel-based audio signal and an audio object-based audio signal.

A type of the audio signal is determined according to a type of a sending conference site. If the sending conference site is an audio channel-based sending conference site, an audio signal sent by the sending conference site is an audio channel-based audio signal. If the sending conference site is an audio object-based sending conference site, an audio signal sent by the sending conference site is an audio object-based audio signal. The audio channel-based sending conference site may be a mono channel-based or multi channel-based sending conference site. Accordingly, the audio channel-based audio signal may be a mono channel-based or multi channel-based audio signal.

The audio object refers to an audio source that is regarded as an object. In addition to an audio signal, one audio object further includes auxiliary information. The auxiliary information includes information of the audio object, such as maximum absolute energy, an energy ratio, space information, position information, different playback modes, and corresponding parameters of the different playback modes.

202: The MCU selects an audio signal for each receiving conference site from the received audio signals.

The MCU may select an audio signal for each receiving conference site according to energy magnitude of each audio signal. A specific selection process may include:

202a: The MCU respectively calculates energy of the audio channel-based audio signal and/or energy of the audio object-based audio signal.

(1) Calculate the energy of the audio channel-based audio signal.

When the audio channel is a mono channel, the energy of the audio channel-based audio signal is energy of the mono channel.

When the audio channel is a multi channel, energy of each audio channel is calculated respectively, and maximum audio channel energy is taken as the energy of the audio channel-based audio signal, or an average value of the energy of each audio channel is taken as the energy of the audio channel-based audio signal.

(2) Calculate the energy of the audio object-based audio signal.

Auxiliary information of the audio object carries maximum absolute energy and an energy ratio of the audio object. The energy ratio of the audio object is the ratio of energy of the audio object to the maximum absolute energy. Absolute energy of the audio object is calculated according to the maximum absolute energy in the audio object and the energy ratio of the audio object. For example, the maximum absolute energy is Emax, energy ratios of audio objects S1, S2, and S3 are respectively a1, a2, and a3, and then absolute energy of the three audio objects is respectively Emax×a1, Emax×a2, and Emax×a3.

202b: The MCU selects, according to magnitude of the energy of the audio channel-based audio signal and/or the energy of the audio object-based audio signal, multiple audio signals that have higher audio signal energy for each receiving conference site. The audio signals selected by the MCU for each receiving conference site may be the same, and may also be different.

For example, the multipoint conference system has five conference sites A, B, C, D, and E. The five conference sites may receive an audio signal, and may also send an audio signal. Audio signals sent by the five conference sites A, B, C, D, and E are A1, B1, C1, D1, and E1 correspondingly. The MCU selects three audio signals B1, C1, and D1 according to energy of the audio signal sent by each conference site. Since each conference site generally does not receive an audio signal sent by the conference site itself, audio signals selected by the MCU for each conference site are shown in Table 1.

TABLE 1

| Receiving conference site | Selected audio signals |
| --- | --- |
| A | B1, C1, D1 |
| B | C1, D1 |
| C | B1, D1 |
| D | B1, C1 |
| E | B1, C1, D1 |

Furthermore, in order to implement a private conversation between two conference sites in a multipoint conference, audio signals sent by two conference sites that need to have a private conversation can be selected by only the other party of the private conversation, but cannot be selected by other conference sites. Therefore, audio signals selected by the MCU for each conference site are shown in Table 2.

TABLE 2

| Receiving conference site | Selected audio signals |
| --- | --- |
| A | B1, C1, D1 |
| B | A1, C1, D1 |
| C | D1 |
| D | C1 |
| E | C1, D1 |

203: Process the selected audio signals according to types of receiving conference sites, where the receiving conference site may be an audio channel-based receiving conference site or an audio object-based receiving conference site.

(1) When the receiving conference site is an audio channel-based receiving conference site, as shown in FIG. 2, the processing the selected audio signals according to the type of the receiving conference site includes:

203a: Convert the selected audio signals into audio signals that are consistent with the number of audio channels of the receiving conference site.

Figure 4:
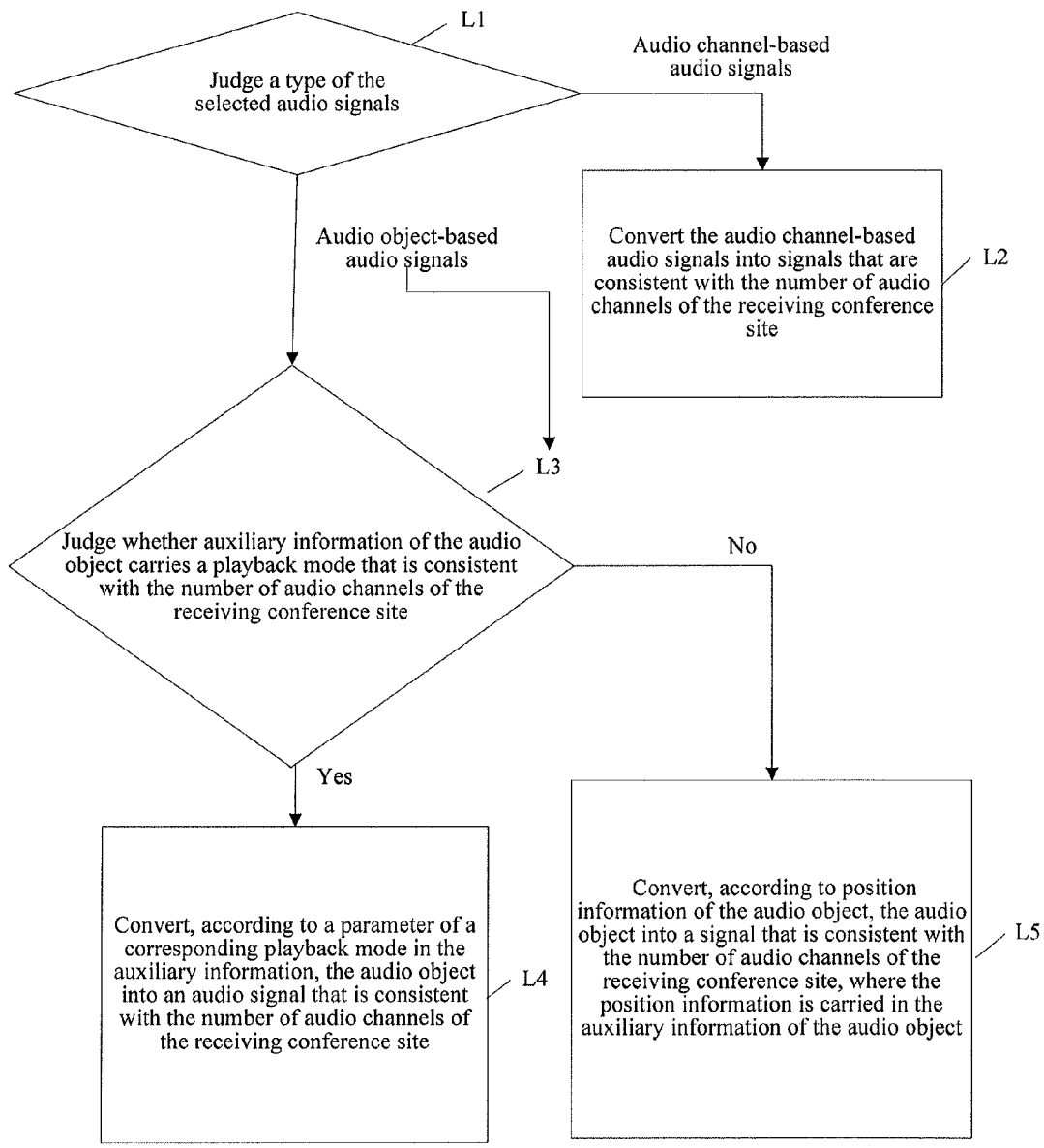
FIG. 4 is a flowchart of converting a selected audio signal into an audio signal that is consistent with the number of audio channels at an audio channel-based receiving conference site according to the second embodiment of the present invention.

As shown in FIG. 4, the converting the selected audio signals into the audio signals that are consistent with the number of audio channels of the receiving conference site may specifically include:

L1: Judge a type of the selected audio signals, and if the selected audio signals are audio channel-based audio signals, perform step L2; and if the selected audio signals are audio object-based audio signals, perform step L3.

L2: Convert the audio channel-based audio signals into signals that are consistent with the number of audio channels of the receiving conference site.

The number of audio channels of the audio channel-based conference site may be mono or multi. For a multi channel, generally, microphones are put at different spatial locations, and a signal collected by each of the microphones is respectively encoded by one audio channel. Since space information is already included between audio channels, sound space information of an original sending conference site can be presented when sound is played at a receiving conference site by using the same number of loudspeakers.

For example, the receiving conference site supports a dual channel signal, and audio channel-based audio signals and selected by the MCU for the receiving conference site are mono channel signals and three-channel signals. Then the MCU copies the mono channel signals to a left channel and a right channel of the receiving conference site at the same time. That is, signal content of the left channel is the same as that of the right channel. For the three-channel signals, the MCU copies a first channel signal to the left channel of the receiving conference site, copies a third channel signal to the right channel of the receiving conference site, and multiplies a second channel signal by a gain of 0.707, and then adds the second channel signal multiplied by the gain of 0.707 to the left channel and the right channel of the receiving conference site at the same time. In this way, the mono channel signals and the three-channel signals are both converted into dual channel signals.

L3: Judge whether auxiliary information of the audio object carries a playback mode that is consistent with the number of audio channels of the receiving conference site, and if the auxiliary information of the audio object carries a playback mode that is consistent with the number of audio channels of the receiving conference site, perform step L4; and if the auxiliary information of the audio object does not carry a playback mode that is consistent with the number of audio channels of the receiving conference site, perform step L5.

The auxiliary information of the audio object carries multiple playback modes and corresponding parameters of multiple playback modes. The playback mode refers to performing playback by using how many audio channels, for example, a dual channel or a five-channel. A parameter of each playback mode represents energy distribution of the audio object in each audio channel. The energy distribution may change with time.

L4: Convert, according to a parameter of a corresponding playback mode in the auxiliary information, the audio object into an audio signal that is consistent with the number of audio channels of the receiving conference site.

For example, the receiving conference site is a dual channel and the auxiliary information carries a dual-channel playback mode, and then the MCU extracts a parameter corresponding to the dual-channel playback mode, and distributes a signal of the audio object to a left channel and a right channel of the receiving conference site according to the parameter.

L5: Convert, according to position information of the audio object, the audio object into a signal that is consistent with the number of audio channels of the receiving conference site, where the position information is carried in the auxiliary information of the audio object.

For example, the auxiliary information has only a dual channel playback mode and a five-channel playback mode but the receiving conference site is a six-channel, and then the MCU converts, according to the position information of the audio object, the audio object into a six-channel audio signal.

The converting, according to the position information of the audio object, the audio object into the signal that is consistent with the number of audio channels of the receiving conference site may specifically be: determining, according to a position of the audio object and a location of a loudspeaker that is corresponding to each audio channel of the receiving conference site, a loudspeaker that is closest to the audio object; and copying the audio object-based audio signal to an audio channel corresponding to the loudspeaker that is closest to the audio object, while other channels are not given any signal.

203b: Perform, based on the audio channel of the receiving conference site, audio mixing on the converted audio signals.

(2) When the receiving conference site is an audio object-based receiving conference site, as shown in FIG. 3, the processing the selected audio signals according to the type of the receiving conference site includes:

203c: Convert the selected audio signals into audio objects according to a presentation mode of the receiving conference site.

The converting the selected audio signals into the audio objects according to the presentation mode of the receiving conference site may specifically include:

S1: Set a presentation mode of the selected audio signals according to the presentation mode of the receiving conference site.

Figure 5:
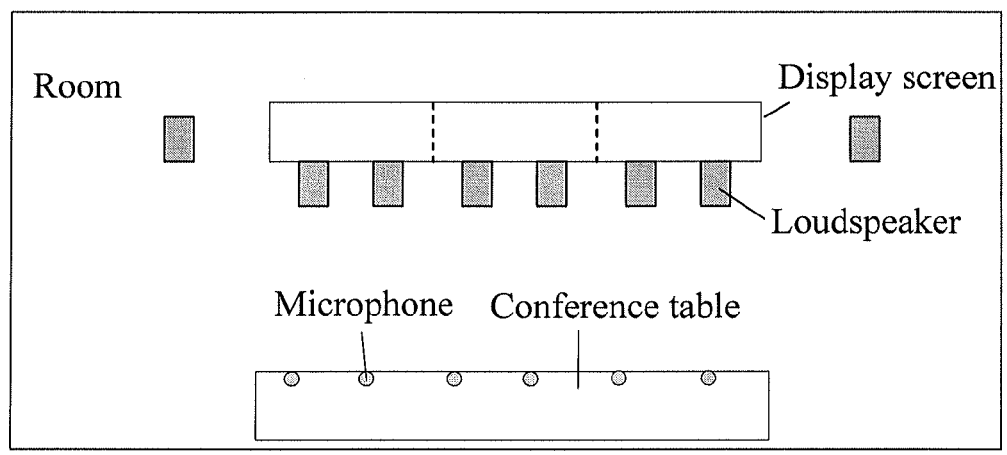
FIG. 5 is a schematic diagram of an audio presentation mode of a TelePresence terminal according to the second embodiment of the present invention.

For example, FIG. 5 shows an audio presentation mode of a TelePresence terminal. An image display screen is made up of three screens. Two loudspeakers exist at the bottom of each screen and one loudspeaker exists on both sides of the screen. A total of eight loudspeakers exist. In order to match an image and a sound, when a person at a location of the screen speaks, a loudspeaker near the bottom of the location makes a sound, so as to match the sound and the image. In a multipoint conference, a conference site where a speech is being made may not be a conference site that is currently shown in the screen, at this time, a sound of the conference site may be distributed to two loudspeakers on the two sides of the screen. For example, three audio signals s1, s2, and s3 are selected. A video signal of a conference site corresponding to the audio signal s1 is being viewed by the receiving conference site, and then it may be set that the audio signal s1 is played by six loudspeakers at the bottom of the screen. Video signals of conference sites corresponding to the audio signals s2 and s3 are not viewed currently, and then it may be designated that the audio signals s2 and s3 are respectively played by the two loudspeakers on the two sides of the screen.

S2: When the selected audio signals are audio channel-based audio signal, convert the selected audio signals into audio objects according to the set presentation mode.

S3: When the selected audio signals are audio object-based audio signals, modify an original relevant parameter of the audio object according to the set presentation mode, so as to satisfy a requirement of the set presentation mode.

203d: Combine the converted audio objects into one audio object stream.

204: Send the processed audio signal to each receiving conference site respectively according to the type of the receiving conference site.

With the method for implementing audio mixing in this embodiment of the present invention, after receiving an audio channel-based audio signal and an audio object-based audio signal, where the audio channel-based audio signal and the audio object-based audio signal are sent by each sending conference site, a multipoint control unit selects audio signals for each receiving conference site, processes the selected audio signals according to types of receiving conference sites, and sends the processed audio signals to each receiving conference site respectively. Compared with the prior art, the multipoint control unit can perform audio mixing on the audio channel-based audio signal and the audio object-based audio signal, so as to be compatible with a conventional conference terminal, a next generation multi channel-based terminal, and a next generation audio object-based terminal in the same multipoint conference, thus improving quality of user experience.

Embodiment 3

Figure 6:
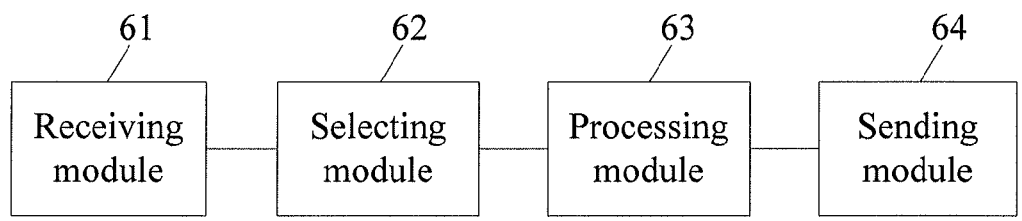
FIG. 6 is a schematic structural diagram of an apparatus for implementing audio mixing according to a third embodiment of the present invention.

This embodiment provides an apparatus for implementing audio mixing. As shown in FIG. 6, the apparatus for implementing audio mixing includes:

A receiving module 61 is configured to receive an audio signal sent by each sending conference site, where the received audio signals include an audio channel-based audio signal and an audio object-based audio signal.

A type of the audio signal is determined according to a type of a sending conference site. If the sending conference site is an audio channel-based sending conference site, an audio signal sent by the sending conference site is an audio channel-based audio signal. If the sending conference site is an audio object-based sending conference site, an audio signal sent by the sending conference site is an audio object-based audio signal. The audio channel-based sending conference site may be a mono channel-based or multi channel-based sending conference site. Accordingly, the audio channel-based audio signal may be a mono channel-based or multi channel-based audio signal. The audio object refers to an audio source that is regarded as an object. In addition to an audio signal, one audio object further includes auxiliary information. The auxiliary information includes information of the audio object, such as maximum absolute energy, an energy ratio, space information, position information, difference playback modes, and corresponding parameters of the different playback modes.

A selecting module 62 is configured to select an audio signal for each receiving conference site from the received audio signals.

A processing module 63 is configured to process the selected audio signals according to types of receiving conference sites, where the receiving conference sites include an audio channel-based receiving conference site and an audio object-based receiving conference site.

A sending module 64 is configured to send the processed audio signal to each receiving conference site respectively according to the type of the receiving conference site.

The same conference site may send an audio signal, and may also receive an audio signal. That is to say, a sending conference site and a receiving conference site may be the same conference site.

With the apparatus for implementing audio mixing in this embodiment of the present invention, after receiving an audio channel-based audio signal and an audio object-based audio signal, where the audio channel-based audio signal and the audio object-based audio signal are sent by each sending conference site, a multipoint control unit selects an audio signal for each receiving conference site, processes the selected audio signals according to types of receiving conference sites, and sends the processed audio signal to each receiving conference site respectively. Compared with the prior art, the multipoint control unit can perform audio mixing on the audio channel-based audio signal and the audio object-based audio signal, so as to be compatible with a conventional conference terminal, a next generation multi channel-based terminal, and a next generation audio object-based terminal in the same multipoint conference, thus improving quality of user experience.

Embodiment 4

Figure 7:
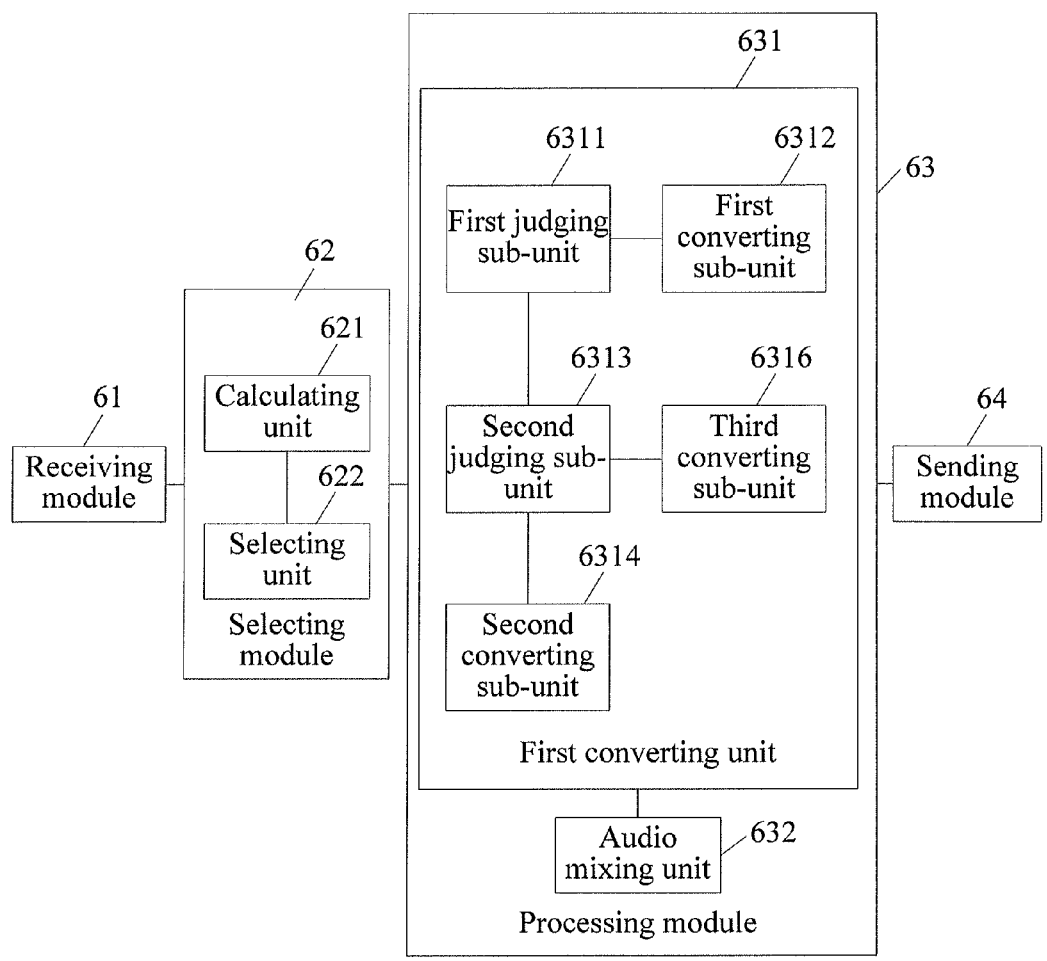
FIG. 7 and FIG. 8 are schematic structural diagrams of an apparatus for implementing audio mixing according to a fourth embodiment of the present invention.
Figure 8:
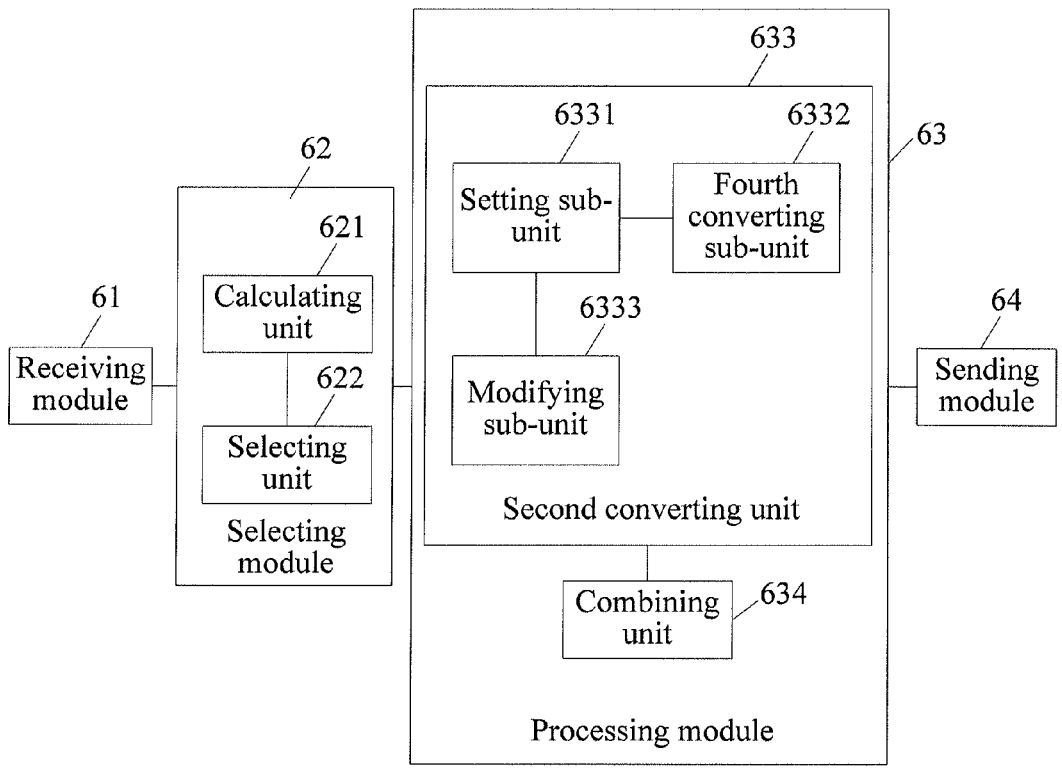

As shown in FIG. 7 and FIG. 8, an apparatus for implementing audio mixing includes: A receiving module 61 is configured to receive an audio signal sent by each sending conference site, where the received audio signals include an audio channel-based audio signal and an audio object-based audio signal.

A type of the audio signal is determined according to a type of a sending conference site. If the sending conference site is an audio channel-based sending conference site, an audio signal sent by the sending conference site is an audio channel-based audio signal. If the sending conference site is an audio object-based sending conference site, an audio signal sent by the sending conference site is an audio object-based audio signal. The audio channel-based sending conference site may be a mono channel-based or multi channel-based sending conference site. Accordingly, the audio channel-based audio signal may be a mono channel-based or multi channel-based audio signal. The audio object refers to an audio source that is regarded as an object. In addition to an audio signal, one audio object further includes auxiliary information. The auxiliary information includes information of the audio object, such as maximum absolute energy, an energy ratio, space information, position information, different playback modes, and corresponding parameters of the different playback modes.

A selecting module 62 is configured to select an audio signal for each receiving conference site from the received audio signals.

A processing module 63 is configured to process the selected audio signals according to types of receiving conference sites, where the receiving conference sites include an audio channel-based receiving conference site and an audio object-based receiving conference site.

A sending module 64 is configured to send the processed audio signal to each receiving conference site respectively according to the type of the receiving conference site.

The same conference site may send an audio signal, and may also receive an audio signal. That is to say, a sending conference site and a receiving conference site may be the same conference site.

The selecting module 62 includes:

a calculating unit 621, configured to respectively calculate energy of the audio channel-based audio signal and/or energy of the audio object-based audio signal; and a selecting unit 622, configured to select audio signals according to the energy of the audio channel-based audio signal and/or the energy of the audio object-based audio signal, where the selecting unit 622 may select, according to magnitude of the energy of the audio channel-based audio signal and/or the energy of the audio object-based audio signal, multiple audio signals that have higher audio signal energy for each receiving conference site; and the audio signals selected by the selecting unit 622 for each receiving conference site may be the same, and may also be different.

When the receiving conference site is an audio channel-based receiving conference site, as shown in FIG. 7, the processing module 63 may include:

a first converting unit 631, configured to convert the selected audio signals into audio signals that are consistent with the number of audio channels of the receiving conference site; and an audio mixing unit 632, configured to perform, based on the audio channel of the receiving conference site, audio mixing on the converted audio signals.

Furthermore, the first converting unit 631 may include:

a first judging sub-unit 6311, configured to judge a type of the selected audio signals;

a first converting sub-unit 6312, configured to, when the selected audio signals are audio channel-based audio signals, convert the audio channel-based audio signals into signals that are consistent with the number of audio channels of the receiving conference site;

a second judging sub-unit 6313, configured to, when the selected audio signals are audio object-based audio signals, judge whether auxiliary information of the audio object carries a playback mode that is consistent with the number of audio channels of the receiving conference site;

a second converting sub-unit 6314, configured to, when the auxiliary information of the audio object carries a playback mode that is consistent with the number of audio channels of the receiving conference site, convert, according to a parameter of a corresponding playback mode in the auxiliary information, the audio object into an audio signal that is consistent with the number of audio channels of the receiving conference site; and a third converting sub-unit 6315, configured to, when the auxiliary information of the audio objects does not carry a playback mode that is consistent with the number of audio channels of the receiving conference site, convert, according to position information of the audio object, the audio object into a signal that is consistent with the number of audio channels of the receiving conference site, where the position information is carried in the auxiliary information of the audio object.

When the receiving conference site is an audio object-based receiving conference site, as shown in FIG. 8, the processing module 63 may include:

a second converting unit 633, configured to convert the selected audio signals into audio objects according to a presentation mode of the receiving conference site; and a combining unit 634, configured to combine the converted audio objects into one audio object stream.

Furthermore, the second converting unit 633 may include:

a setting sub-unit 6331, configured to set a presentation mode of the selected audio signals according to the presentation mode of the receiving conference site;

a fourth converting sub-unit 6332, configured to, when the selected audio signals are audio channel-based audio signals, convert the selected audio signals into audio objects according to the set presentation mode; and a modifying sub-unit 6333, configured to, when the selected audio signals are audio object-based audio signals, modify a parameter of the audio object according to the set presentation mode.

After receiving an audio channel-based audio signal and an audio object-based audio signal, where the audio channel-based audio signal and the audio object-based audio signal are sent by each sending conference site, the apparatus for implementing audio mixing in this embodiment of the present invention selects an audio signal for each receiving conference site, processes the selected audio signals according to types of receiving conference sites, and sends the processed audio signal to each receiving conference site respectively. Compared with the prior art, the apparatus can perform audio mixing on the audio channel-based audio signal and the audio object-based audio signal, so as to be compatible with a conventional conference terminal, a next generation multi channel-based terminal, and a next generation audio object-based terminal in the same multipoint conference, thus improving quality of user experience.

Embodiment 5

Figure 9:
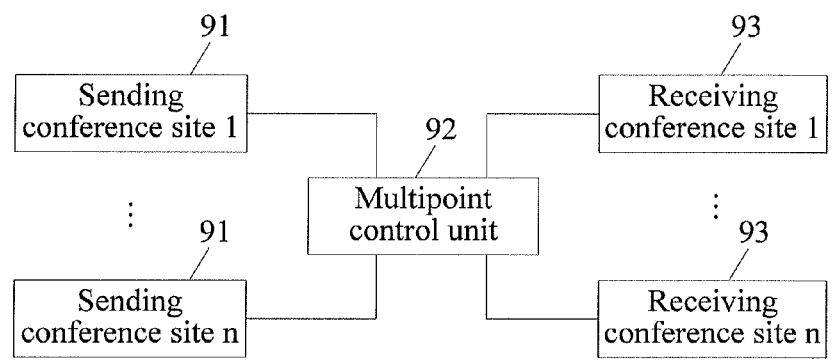
FIG. 9 is a schematic structural diagram of a system for implementing audio mixing according to a fifth embodiment of the present invention.

This embodiment provides a system for implementing audio mixing, as shown in FIG. 9, which includes multiple sending conference sites 91, multiple receiving conference sites 93, and a multipoint control unit 92.

The sending conference sites 91 are configured to send audio signals to the multipoint control unit 92, where the audio signals include an audio channel-based audio signal and an audio object-based audio signal.

The multipoint control unit 92 is configured to receive the audio signals sent by the sending conference sites 91, select an audio signal for each receiving conference site 93 from the received audio signals, process the selected audio signals according to types of receiving conference sites 93, and send the processed audio signal to each receiving conference site 93 respectively according to the type of the receiving conference site, where the receiving conference sites 93 include an audio channel-based receiving conference site and an audio object-based receiving conference site.

The receiving conference sites 93 are configured to receive the processed audio signals from the multipoint control unit 92.

The same conference site may send an audio signal, and may also receive an audio signal. That is to say, a sending conference site and a receiving conference site may be the same conference site.

In the system for implementing audio mixing in this embodiment of the present invention, after receiving an audio channel-based audio signal and an audio object-based audio signal, where the audio channel-based audio signal and the audio object-based audio signal are sent by each sending conference site, a multipoint control unit selects an audio signal for each receiving conference site, processes the selected audio signals according to types of receiving conference sites, and sends the processed audio signal to each receiving conference site respectively. Compared with the prior art, the multipoint control unit can perform audio mixing on the audio channel-based audio signal and the audio object-based audio signal, so as to be compatible with a conventional conference terminal, a next generation multi channel-based terminal, and a next generation audio object-based terminal in the same multipoint conference, thus improving quality of user experience.

The apparatus and the system for implementing audio mixing that are provided in the embodiments of the present invention can implement the method embodiments provided in the preceding. The method, the apparatus, and the system for implementing audio mixing that are provided in the embodiments of the present invention may be applied to the same multipoint conference where a conventional conference terminal, a next generation multi channel-based terminal, and a next generation audio object-based terminal are compatible, but the present invention is not limited to this.

Persons of ordinary skill in the art may understand that, all or a part of processes in the method in the preceding embodiments may be accomplished by a computer program instructing relevant hardware. The program may be stored in a computer-readable storage medium. When the program is executed, processes of the method in the preceding embodiments may be performed. The storage medium may be a magnetic disk, an optical disk, a read-only memory (Read-Only Memory, ROM), or a random access memory (Random Access Memory, RAM).

The preceding descriptions are merely specific embodiments of the present invention, but are not intended to limit the protection scope of the present invention. Variations or replacements that may be easily thought by persons skilled in the art within the technical scope disclosed by the present invention shall all fall within the protection scope of the present invention. Therefore, the protection scope of present invention shall be subject to the protection scope of the claims.

What is claimed is:

1. A method for implementing audio mixing, comprising:

receiving, by a Multipoint Control Unit (MCU), an audio signal sent by each sending conference site, wherein the received audio signals comprise an audio channel-based audio signal and an audio object-based audio signal;

selecting, by the MCU, audio signals for a receiving conference site from the received audio signals;

processing, by the MCU, the audio signals selected for the receiving conference site according to a type of the receiving conference site, wherein the receiving conference site is one of an audio channel-based receiving conference site and an audio object-based receiving conference site; and sending, by the MCU, the processed audio signal to the receiving conference site;

wherein when the receiving conference site is an audio object-based receiving conference site, the processing the audio signals selected for the receiving conference site according to the type of the receiving conference site comprises:

converting the selected audio signals into audio objects according to a presentation mode of the receiving conference site; and combining the converted audio objects into one audio object stream.

2. The method for implementing audio mixing according to claim 1, wherein the selecting the audio signals for the receiving conference site from the received audio signals comprises:

respectively calculating energy of the audio channel-based audio signal and energy of the audio object-based audio signal; and selecting the audio signals according to the energy of the audio channel-based audio signal and the energy of the audio object-based audio signal.

3. The method for implementing audio mixing according to claim 2, wherein the calculating the energy of the audio channel-based audio signal comprises:

when the audio channel is a mono channel, taking the energy of the audio channel-based audio signal as energy of the mono channel; and when the audio channel is a multi channel, calculating energy of each audio channel respectively, and taking maximum audio channel energy as the energy of the audio channel-based audio signal, or taking an average value of energy of each audio channel as the energy of the audio channel-based audio signal.

4. The method for implementing audio mixing according to claim 2, wherein the calculating the energy of the audio object-based audio signal comprises:

calculating absolute energy of an audio object in the audio object-based audio signal according to maximum absolute energy and a ratio of energy of the audio object to the maximum absolute energy, wherein the maximum absolute energy and the ratio of energy of the audio object to the maximum absolute energy are carried in auxiliary information of the audio object.

5. The method for implementing audio mixing according to claim 1, wherein when the receiving conference site is an audio channel-based receiving conference site, the processing the audio signals selected for the receiving conference site according to the type of the receiving conference site comprises:

converting the selected audio signals into audio signals wherein number of channels of each converted audio signal is consistent with the number of audio channels of the receiving conference site; and performing, based on the audio channel of the receiving conference site, audio mixing on the converted audio signals.

6. The method for implementing audio mixing according to claim 5, wherein the converting the selected audio signals into the audio signals wherein number of channels of each converted audio signal is consistent with the number of audio channels of the receiving conference site comprises:

judging a type of each of the selected audio signals;

if the selected audio signals comprises an audio channel-based audio signal, converting the audio channel-based audio signal into an audio signal wherein number of channels of the converted audio signal is consistent with the number of audio channels of the receiving conference site;

if the selected audio signals comprises an audio object-based audio signal, judging whether auxiliary information of an audio object in the audio object-based audio signal carries a playback mode that is consistent with the number of audio channels of the receiving conference site;

if the auxiliary information of the audio object carries a playback mode that is consistent with the number of audio channels of the receiving conference site, converting, according to a parameter of a corresponding playback mode in the auxiliary information, the audio object into an audio signal wherein number of channels of the converted audio signal is consistent with the number of audio channels of the receiving conference site; and if the auxiliary information of the audio object does not carry a playback mode that is consistent with the number of audio channels of the receiving conference site, converting, according to position information of the audio object, the audio object into an audio signal wherein number of channels of the converted audio signal is consistent with the number of audio channels of the receiving conference site, wherein the position information is carried in the auxiliary information of the audio object.

7. The method for implementing audio mixing according to claim 6, wherein the converting, according to the position information of the audio object, the audio object into the audio signal wherein number of channels of the converted audio signal is consistent with the number of audio channels of the receiving conference site comprises:

determining, according to a position of the audio object and a location of a loudspeaker that is corresponding to each audio channel of the receiving conference site, a loudspeaker that is closest to the audio object; and copying the audio object-based audio signal to an audio channel corresponding to the loudspeaker that is closest to the audio object.

8. The method for implementing audio mixing according to claim 1, wherein the converting the selected audio signals into the audio objects according to the presentation mode of the receiving conference site comprises:

setting a presentation mode of the selected audio signals according to the presentation mode of the receiving conference site;

when the selected audio signals comprises an audio channel-based audio signal, converting the audio channel-based audio signal into an audio object according to the set presentation mode; and when the selected audio signals comprises an audio object-based audio signal, modifying a parameter of the audio object according to the set presentation mode.

9. An apparatus for implementing audio mixing, specifically a multipoint control unit, wherein the apparatus comprises:

a receiving module, configured to receive an audio signal sent by each sending conference site, wherein the audio signals comprise an audio channel-based audio signal and an audio object-based audio signal;

a selecting module, configured to select audio signals for a receiving conference site from the received audio signals;

a processing module, configured to process the selected audio signals according to a type of the receiving conference site, wherein the receiving conference site is one of an audio channel-based receiving conference site and an audio object-based receiving conference site; and a sending module, configured to send the processed audio signal to the receiving conference site;

wherein the processing module comprises:

a first converting unit, configured to convert the selected audio signals into audio objects according to a presentation mode of the receiving conference site; and a combining unit, configured to combine the converted audio objects into one audio object stream.

10. The apparatus for implementing audio mixing according to claim 9, wherein the selecting module comprises:

a calculating unit, configured to respectively calculate energy of the audio channel-based audio signal and energy of the audio object-based audio signal; and a selecting unit, configured to select audio signals according to the energy of the audio channel-based audio signal and the energy of the audio object-based audio signal.

11. The apparatus for implementing audio mixing according to claim 9, wherein the processing module further comprises:

a second converting unit, configured to convert the selected audio signals into audio signals wherein number of channels of each converted audio signal is consistent with the number of audio channels of the receiving conference site; and an audio mixing unit, configured to perform, based on the audio channel of the receiving conference site, audio mixing on the converted audio signals.

12. The apparatus for implementing audio mixing according to claim 11, wherein the second converting unit comprises:

a first judging sub-unit, configured to judge a type of each of the selected audio signals;

a first converting sub-unit, configured to, when the selected audio signals comprises an audio channel-based audio signal, convert the audio channel-based audio signal into an audio signal wherein number of channels of each converted audio signal is consistent with the number of audio channels of the receiving conference site;

a second judging sub-unit, configured to, when the selected audio signals comprises an audio object-based audio signal, judge whether auxiliary information of an audio object in the audio object-based audio signal carries a playback mode that is consistent with the number of audio channels of the receiving conference site;

a second converting sub-unit, configured to, when the auxiliary information of the audio object carries a playback mode that is consistent with the number of audio channels of the receiving conference site, convert, according to a parameter of a corresponding playback mode in the auxiliary information, the audio object into an audio signal wherein number of channels of the converted audio signal is consistent with the number of audio channels of the receiving conference site; and a third converting sub-unit, configured to, when the auxiliary information of the audio object does not carry a playback mode that is consistent with the number of audio channels of the receiving conference site, convert, according to position information of the audio object, the audio object into an audio signal wherein number of channels of the converted audio signal is consistent with the number of audio channels of the receiving conference site, wherein the position information is carried in the auxiliary information of the audio object.

13. The apparatus for implementing audio mixing according to claim 9, wherein the first converting unit comprises:

a setting sub-unit, configured to set a presentation mode of the selected audio signals according to the presentation mode of the receiving conference site;

a fourth converting sub-unit, configured to, when the selected audio signals comprises an audio channel-based audio signal, convert the audio channel-based audio signal into an audio object according to the set presentation mode; and a modifying sub-unit, configured to, when the selected audio signals comprises an audio object-based audio signal, modify a parameter of the audio object according to the set presentation mode.

14. A system for implementing audio mixing, comprising multiple sending conference sites, multiple receiving conference sites, and a multipoint control unit, wherein:

the sending conference sites are configured to send audio signals to the multipoint control unit, wherein the audio signals comprise an audio channel-based audio signal and an audio object-based audio signal;

the multipoint control unit is configured to receive the audio signals sent by the sending conference sites, select audio signals for a receiving conference site of the multiple receiving conference sites from the received audio signals, process the selected audio signals according to a type of the receiving conference site, and send the processed audio signal to the receiving conference site, wherein the receiving conference site is one of an audio channel-based receiving conference site and an audio object-based receiving conference site.

* * * * *